US011143597B2

(12) United States Patent
Praharaj et al.

(10) Patent No.: US 11,143,597 B2
(45) Date of Patent: Oct. 12, 2021

(54) WATER INGRESS INDICATOR FOR ELECTRONIC DEVICES

(71) Applicant: Xerox Corporation, Norwalk, CT (US)

(72) Inventors: Seemit Praharaj, Webster, NY (US); Jason M. LeFevre, Penfield, NY (US); Paul J. McConville, Webster, NY (US); Douglas K. Herrmann, Webster, NY (US); Chu-heng Liu, Penfield, NY (US)

(73) Assignee: XEROX CORPORATION, Norwalk, CT (US)

( * ) Notice: Subject to any disclaimer, the term of this patent is extended or adjusted under 35 U.S.C. 154(b) by 885 days.

(21) Appl. No.: 15/879,557

(22) Filed: Jan. 25, 2018

(65) Prior Publication Data

US 2019/0226996 A1   Jul. 25, 2019

(51) Int. Cl.

| G01N 21/88 | (2006.01) |
| G01D 7/00 | (2006.01) |
| G01M 3/00 | (2006.01) |
| G01N 21/94 | (2006.01) |
| G01N 21/84 | (2006.01) |
| G01N 31/22 | (2006.01) |
| G01N 21/956 | (2006.01) |

(52) U.S. Cl.
CPC ......... *G01N 21/8803* (2013.01); *G01D 7/005* (2013.01); *G01M 3/00* (2013.01); *G01N 21/8422* (2013.01); *G01N 21/94* (2013.01); *G01N 21/956* (2013.01); *G01N 31/222* (2013.01); *G01N 2021/8427* (2013.01); *G01N 2021/945* (2013.01)

(58) Field of Classification Search
CPC .............. G01N 21/8803; G01N 21/94; G01N 21/8422; G01N 2021/945; G01N 2021/8427; G01N 31/222; G01N 21/956; G01M 3/00; G01M 3/20; G01D 7/005
See application file for complete search history.

(56) References Cited

U.S. PATENT DOCUMENTS 5,556,727 A   9/1996   Ciccarelli et al.
6,569,373 B2   5/2003   Napadensky
(Continued)

OTHER PUBLICATIONS

U.S. Appl. No. 15/873,056, Jan. 17, 2018, Herrmann, et al.
U.S. Appl. No. 15/293,164, Oct. 13, 2016, Chopra, et al.
U.S. Appl. No. 15/293,195, Oct. 13, 2016, Chopra, et al.

*Primary Examiner* — Nimeshkumar D Patel
*Assistant Examiner* — Tania Courson
(74) *Attorney, Agent, or Firm* — Fay Sharpe LLP

(57) ABSTRACT

An electronic device and a method for predicting water ingress employ a water damage indicator including a water-dispersible coating layer which includes a water-dispersible, radiation-cured polymer. Electronic components of the device, which may be susceptible to water damage, are disposed within a casing. The water damage indicator may contact the casing of the electronic device and/or the electronic components. When water enters the casing, the water dispersible coating layer is at least partially removed, revealing the surface beneath, thereby providing an indication of potential water damage to the electronic components. The water damage indicator is not readily replaceable after manufacture, making it more difficult for a customer to disguise potential water damage to the device.

20 Claims, 7 Drawing Sheets

(56) References Cited

U.S. PATENT DOCUMENTS

| | | | | |
|---|---|---|---|---|
| 6,893,731 | B2* | 5/2005 | Kausch | C08F 265/04 |
| | | | | 264/288.4 |
| 7,300,619 | B2 | 11/2007 | Napadensky et al. | |
| 8,210,032 | B2* | 7/2012 | Sanford | G01N 31/222 |
| | | | | 73/73 |
| 8,440,274 | B2* | 5/2013 | Wang | G09F 3/0291 |
| | | | | 428/34.1 |
| 9,086,298 | B2* | 7/2015 | Wang | G09F 3/0291 |
| 9,300,773 | B2* | 3/2016 | Mittleman | H04M 1/0274 |
| 9,566,800 | B2* | 2/2017 | Liu | B41J 2/325 |
| 10,040,957 | B2* | 8/2018 | Brust | C09D 11/102 |
| 10,578,559 | B2* | 3/2020 | Silvanto | G01N 21/8803 |
| 2006/0234014 | A1* | 10/2006 | Liu | B65D 55/026 |
| | | | | 428/195.1 |
| 2008/0145611 | A1* | 6/2008 | Mess | B32B 27/36 |
| | | | | 428/143 |
| 2009/0301382 | A1* | 12/2009 | Patel | G01N 31/229 |
| | | | | 116/201 |
| 2011/0224638 | A1* | 9/2011 | Cohen | A61F 13/42 |
| | | | | 604/361 |
| 2014/0342152 | A1* | 11/2014 | Amano | C09J 7/385 |
| | | | | 428/355 AC |
| 2016/0345437 | A1 | 11/2016 | Heikkinen et al. | |
| 2017/0252471 | A1* | 9/2017 | Patel | C09D 11/322 |
| 2017/0254760 | A1 | 9/2017 | Silvanto et al. | |
| 2019/0240897 | A1* | 8/2019 | Liu | C09J 7/401 |

* cited by examiner

WATER INGRESS INDICATOR FOR ELECTRONIC DEVICES

BACKGROUND

The exemplary embodiment relates to the detection of potential water damage to electronic devices, such as cellphones, portable music players, cameras, tablets, and laptops.

Many electronic devices are susceptible to damage if water penetrates the casing and makes contact with electronic components. Generally, water damage is not covered by the standard manufacturer's warranty. However, once a device has dried out, the cause of the damage may not be readily attributed to water, without a thorough inspection. Water damage indicators have been developed to establish whether or not liquid is responsible for the damage to an electronic device. Such water damage indicators may be in the form of tape or stickers which are located strategically within the devices. The indicator may contain a water-based dye which is washed away when it comes in contact with water, causing the indicator to change color.

One problem with using such water damage indicators is that they can be peeled off and replaced by the owner with a new indicator, making a determination of the cause of damage difficult without an advanced inspection, which may entail disassembling the device.

There remains a need for an indicator for assessing water damage which overcomes these problems.

INCORPORATION BY REFERENCE

The following references, the disclosures of which are incorporated herein in their entireties, are mentioned:

US Pub. No. 20170254760, published Sep. 7, 2017, entitled LIQUID CONTACT INDICATOR, by Mikael M. Silvanto, et al., describes an indication member for determining liquid exposure in an electronic device. The indication member includes ink covered by a liquid-permeable layer that allows liquid to pass through the layer and contact the ink, resulting in a visible or detectable pattern.

U.S. Pub. No. 20160345437, published Nov. 24, 2016, entitled THERMOFORMED PLASTIC COVER FOR ELECTRONICS AND RELATED METHOD OF MANUFACTURE, by Mikko Heikkinen, et al., describes forming a casing for an electronic device.

U.S. Pat. No. 6,569,373, published May 27, 2003, entitled COMPOSITIONS AND METHODS FOR USE IN THREE DIMENSIONAL MODEL PRINTING, by Napadensky, describes compositions for use as a support and/or release material which include at least one non-reactive and low-toxicity compound, at least one surface-active agent, at least one stabilizer and optionally at least one reactive component and at least one photo-initiator.

U.S. Pat. No. 7,300,619, published Nov. 27, 2007, entitled Compositions and methods for use in three dimensional model printing, by Napadensky, et al., describes a two-phase composition where one phase includes a non-reactive, water-dispersible component, which allows the cured polymer in the first phase to disperse in water as small fragments.

U.S. application Ser. No. 15/293,164, filed Oct. 13, 2016, entitled REMOVABLE SUPPORT MATERIAL FOR ADDITIVE MANUFACTURING, by Naveen Chopra, et al., describes a water-washable support material for use in additive manufacturing.

U.S. application Ser. No. 15/293,195, filed Oct. 13, 2016, entitled REMOVABLE SUPPORT MATERIAL COMPRISING TACKIFIER FOR ADDITIVE MANUFACTURING, by Naveen Chopra, et al., describes a water-washable and meltable support material composition comprising a tackifier resin for use in additive manufacturing.

BRIEF DESCRIPTION

In accordance with one aspect of the exemplary embodiment, an electronic device includes a casing, electronic components within the casing, and a water damage indicator within the casing. The water damage indicator includes a radiation cured, water-dispersible layer, such that when water enters the casing, the water dispersible layer is at least partially removed, thereby providing an indication of water damage to the electronic components.

In accordance with another aspect of the exemplary embodiment, a method of forming the electronic device includes providing a substrate, coating the substrate with a radiation-curable composition, curing the radiation-curable composition to form a radiation cured, water-dispersible layer on the substrate, and forming an electronic device from the substrate and radiation cured, water-dispersible layer. The substrate may include the electronic components. Alternatively or additionally, the substrate may include a casing member or a moldable sheet from which a casing member is formed after the coating of the substrate with the radiation-curable composition. The casing member forms a part of the casing.

In accordance with another aspect of the exemplary embodiment, a method of predicting ingress of water to an electronic device includes providing an electronic device as described above and detecting whether a color change has occurred due to water dispersion of at least a part of the radiation cured, water-dispersible layer. When the occurrence of the color change is detected, the ingress of water is predicted.

In accordance with another aspect of the exemplary embodiment, a device includes a casing and components within the casing that are susceptible to water damage. A water damage indicator is mounted within the casing. The water damage indicator includes a radiation cured, water-dispersible layer in direct contact with at least a part of the casing. The water-dispersible layer includes a matrix material and a colorant, dispersed in the matrix material, such that when water enters the casing, the water dispersible layer is at least partially removed to reveal the casing, thereby providing an indication of water damage to the components.

In accordance with another aspect of the exemplary embodiment, a method for detecting water damage in an electronic device includes receiving an electronic device which may have suffered water damage through ingress of water, examining a water damage indicator which includes a water-dispersible polymer layer which has been directly applied onto an interior surface of the electronic device by UV curing a UV-curable composition. The polymer layer has a different color to the interior surface of the electronic device. An extent of water damage is predicted based on a level of the polymer layer removed.

DETAILED DESCRIPTION

An apparatus and method for forming an electronic device with a water ingress indicator and an electronic device incorporating such an indicator are described herein. An exemplary indicator includes an ultraviolet (UV) cured, water-dispersible ink. The ink is applied to an electronic device and causes an observable change in appearance, e.g., a change in color, when the indicator comes into contact with water.

Figure 1:
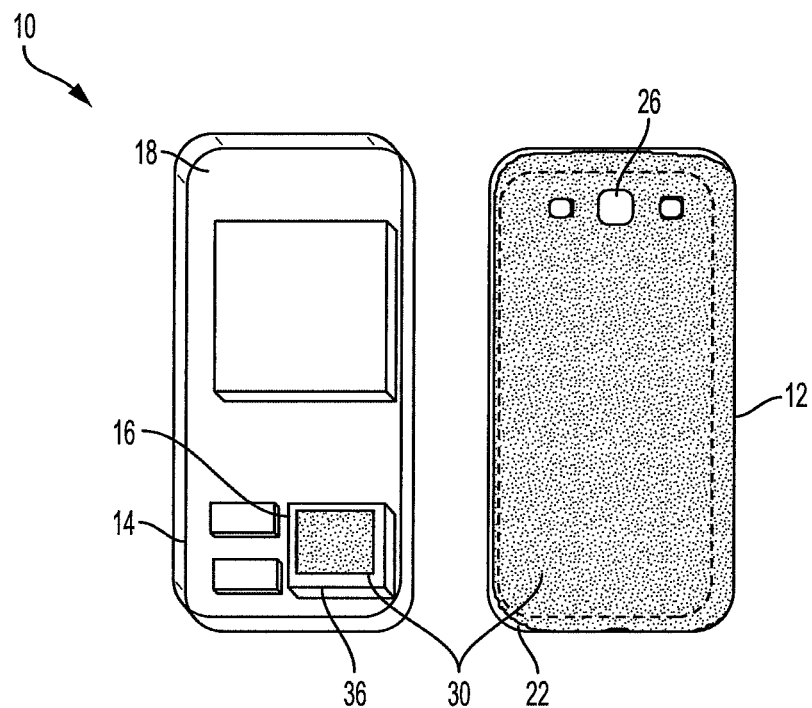
FIG. 1 is a perspective view of an electronic device with a water ingress indicator in accordance with one aspect of the exemplary embodiment.
Figure 2:
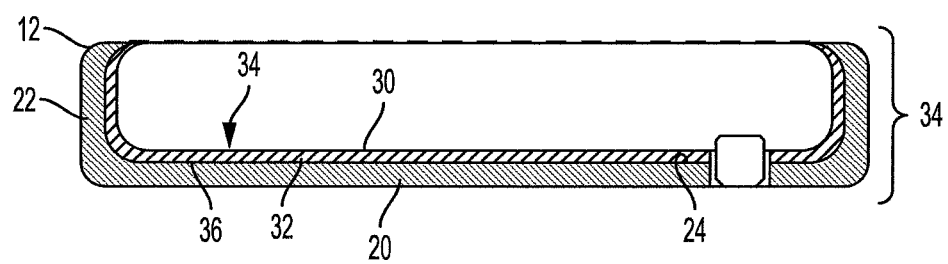
FIG. 2 is a side sectional view of a casing member of the electronic device of FIG. 1.

With reference to FIG. 1, a portable electronic device 10, such as a mobile phone, laptop, tablet, media player, camera, or the like, includes first and second casing members 12, 14. The members 12, 14 cooperate to form a casing which encloses water-sensitive components 16 of the device 10. The components 16 may be electronic components, such as a battery, screen, memory, processor, electronic circuitry, and the like. In the illustrated embodiment, at least some of the electronic components 16 are mounted to an inner surface 18 of second casing member 14, although other arrangements are contemplated. As illustrated in FIG. 2, the second casing member 12 includes a base 20 and an upwardly-extending side wall 22 having four sides, which together define an inner surface 24 of the casing member. The casing member(s) 12, 14 may be formed of plastic, metal, or the like and may include one or more apertures 26 which allow electronic components, buttons, etc., to extend through the assembled casing.

A water ingress indicator 30 is supported on one or both of the casing members. Although shown in the FIGURES, the indicator 30 may be hidden from view when the casing is assembled. In one embodiment, the indicator 30 is in the form of a layer 32 on the inner surface 24 of the first casing member 12. Together, the casing member 12 and the layer 32 form a 3-dimensional structure 34. The indicator layer 32 may partially or wholly cover the base 20 and/or side wall 22 of the casing member 12. Alternatively or additionally, the indicator 30 may be in the form of a layer on a surface 36 of one or more of the electronic components 16. In the case of mobile phone casings, the casing member may include a unique ID, which may be suitably used as the location for the indicator.

Figure 3:
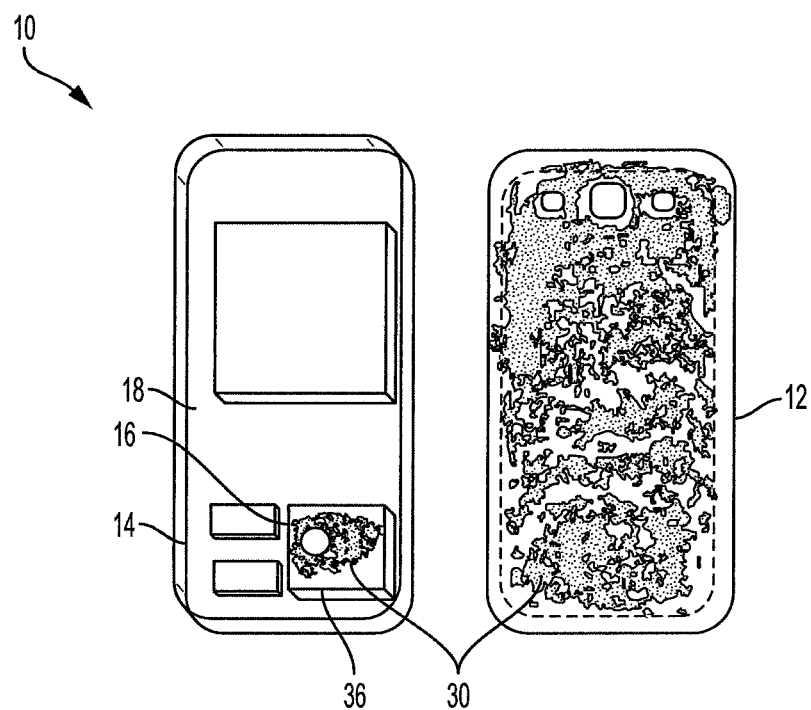
FIG. 3 is a perspective view of electronic device of FIG. 1 following water ingress.
Figure 4:
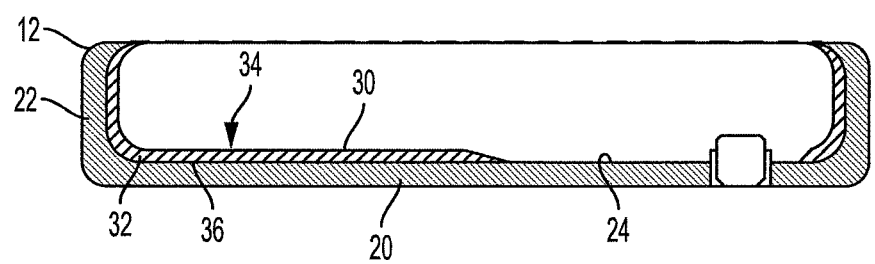
FIG. 4 is a side sectional view of the casing member of the electronic device following water ingress.

The indicator 30 includes or consists of a water-dispersible (which includes water-soluble) coating, which may be in the form of a single layer 32 or multiple layers of the same water-dispersible material. The water-dispersible layer 32 may be in direct contact with at least a part of the casing and/or the electronic components 16 and, in some embodiments, may define both upper and lower planar surfaces 34, 36 of the indicator 30. The layer 32 has a different appearance (e.g., a different color, texture, and/or gloss) from the surface on which it is disposed, e.g., the interior surface 24 of the casing 12. When contacted with water (or other aqueous liquid), the indicator layer 32 dissolves or disperses in the water, and is at least partially washed away, resulting in a detectable change, as illustrated in FIGS. 3 and 4. For example, the layer may become discontinuous, exposing part of the inner surface 24 of the casing, resulting in a mottled appearance which is easily detected by the human eye (and/or by a device for measuring variations in color, gloss and/or texture). When the indicator 30 is applied to electronic component(s) 16, the underlying surface 34 of the component becomes (more) visible as the layer is washed away.

In one embodiment, the interior surface of the casing member(s) 12, 14 is white and the layer 32 is a different color, such as blue. In another embodiment, the casing member is non-white and the layer is white.

In the exemplary embodiment, the indicator layer 32 is formed of a polymeric material in which a colorant, such as a pigment or dye, is dispersed, e.g., generally homogeneously throughout the layer. The polymeric material may include a cured polymer that is water-dispersible (e.g., water-soluble), allowing it to be washed away by water. In one embodiment, the indicator layer 32 may be formed, at least in part, from a water dispersible, UV curable ink, which displays the standard properties of a UV curable material when fully cured, such as excellent mechanical properties, surface finish, temperature stability etc. while having an added versatility of being soluble/otherwise dispersible when it comes in contact with water. On contact with water the water dispersible UV ink simply washes off within seconds revealing the bare plastic (or other substrate) underneath.

The indicator layer(s) 32 may be of substantially uniform thickness. The thickness of the layer 32 (as measured between the upper and lower surfaces 34, 36) may be for example, at least 0.1 microns (μm), such as up to 50 μm. The thickness of the layer may be constrained, to some extent, by the shape and/or size of the substrate/electronic device to which it is applied and/or the method and/or apparatus for deposition of the layer (e.g., a 3D printer). In some cases, a thicker layer 32 may be generated by layering two or more sub-layers, one on top of the other.

The exemplary indicator layer 32 covers at least 20% or at least 50%, or at least 70% of the base 20 of the casing member 12 or 14. The exemplary indicator 30 is not adhesively attached to the casing, but is attached through UV curing.

While a single indicator layer 32 is shown, it is also contemplated that the indicator may be a multi-layer construction. For example, a first water soluble layer of the indicator which is in contact with the casing member (and/or electronics) may be a first color and a second water soluble layer in contact with the first layer may be a second color, different from the first layer. Progressive washing away of the layers reveals different colors, which may be used as an indicator of the extent of water damage.

Figure 5:
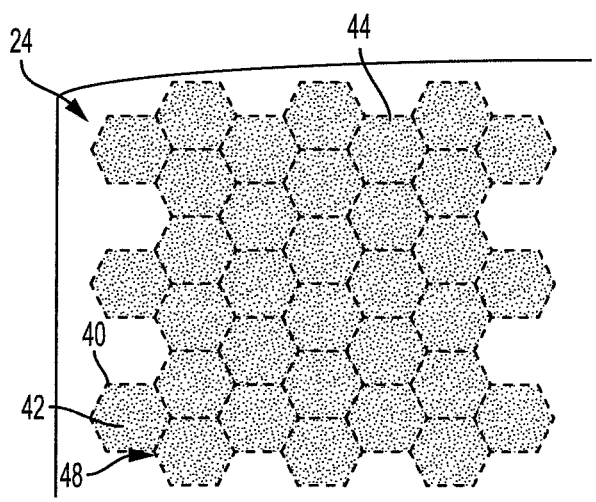
FIG. 5 is an enlarged view of an indicator in accordance with another aspect of the exemplary embodiment.

With reference to FIG. 5, in one embodiment, the indicator layer 32 includes water-insoluble regions 40 (illustrated by dashed hexagons) which are designed to remain intact when water-soluble regions (cells) 42 of the indicator layer are washed away. The water-insoluble regions 40 may be formed from a water-insoluble material (e.g., a cured polymer or phase change material) or a material which is less water-soluble than the polymer used to form the water-soluble regions 42. The indicator 30 is thus composed of cells of the water-soluble polymer that are divided by boundaries made of non-soluble or slightly-soluble polymer. Small channels 44 connect the cells allowing water to infiltrate at a restricted rate. The greater the infiltration, the greater the indication of potential water damage.

Figure 6:
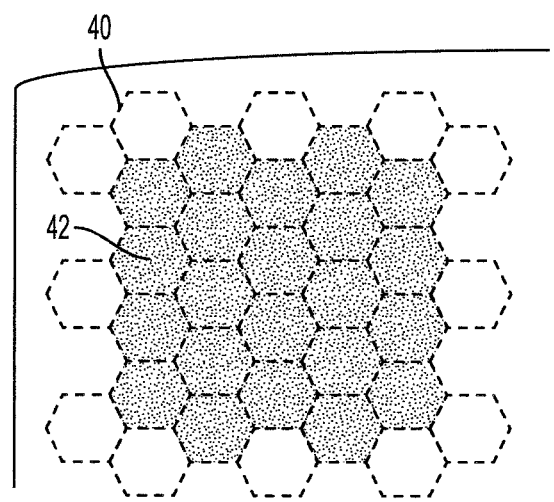
FIG. 6 is an enlarged view of the indicator of FIG. 5 following minor contact with water.
Figure 7:
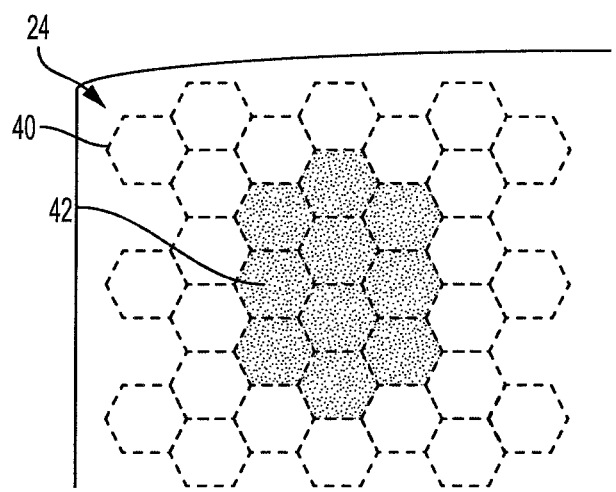
FIG. 7 is an enlarged view of the indicator of FIG. 5 following medium contact with water.
Figure 8:
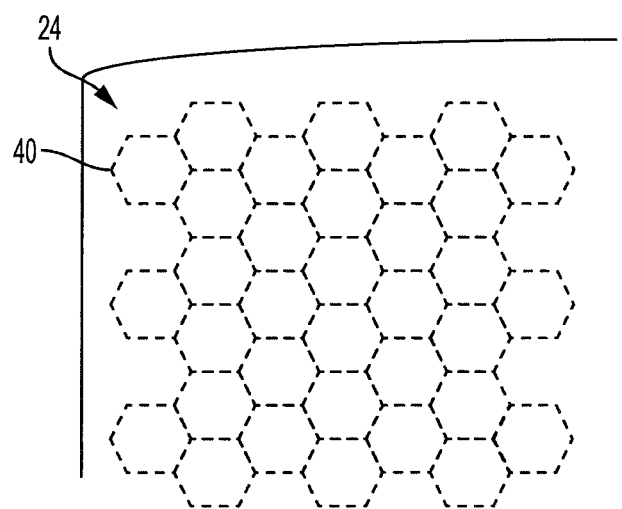
FIG. 8 is an enlarged view of the indicator of FIG. 5 following major contact with water.
Figure 9:
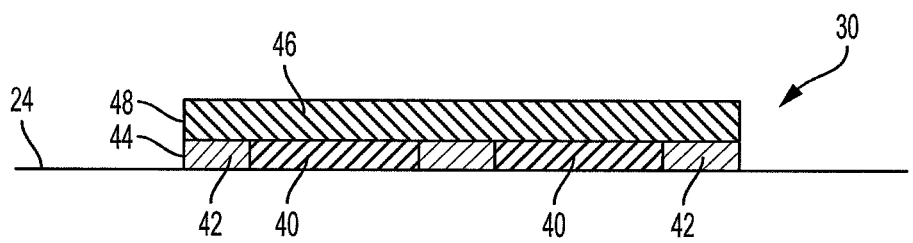
FIG. 9 is a side sectional view of an indicator in accordance with another aspect of the exemplary embodiment.

While hexagons are shown, any suitable design of insoluble and insoluble regions may be generated. Specific designs can be formed by printing to detect the level of water damage. In the illustrated embodiment, the water-insoluble regions 40 are discontinuous, allowing water to creep across the surface 24 through channels 44 between the water-insoluble regions 40. As shown in FIG. 6, the water may dissolve the outer water-soluble regions 42 first. Then, the water progresses through the channels 44, gradually reaching the least accessible water-soluble regions 42 (FIG. 7) until no water-soluble regions remain (FIG. 8). The extent of removal of water-soluble regions may be used as an indicator of the extent of water exposure and hence a predictor of the extent of water damage. In one embodiment, as illustrated in FIG. 9, a transparent water-insoluble protective layer 46 may be formed on top of the arrangement of FIG. 5, so that the water is restricted to entering the indicator through the water-soluble gaps in a perimeter 48 of the indicator 30. A water-insoluble transparent layer 46 may also be used in the embodiment of FIGS. 1-4 to restrict the ingress of water to the layer 32 to a predefined water ingress region or regions.

Where present, the water-soluble indicator layer(s) 32, water-soluble regions 42, water-insoluble regions 40, and water-insoluble protective layer 46 may each be formed from a radiation curable (e.g., UV-curable) polymer-forming composition, which is cured with a radiation source to form a hardened solid polymer. The polymer composition may include a colorant, such as a dye, to provide the cured polymer with a desired color, one or more polymer-forming monomers or oligomers thereof, optionally a free-radical initiator, and optionally a cross-linking agent, such as a di- or poly-functional monomer.

Polymers suitable for use as the indicator layer 32 or water-dispersible regions 42 thereof include hydrophilic polymers containing polar or charged functional groups, rendering them soluble in water. Certain polar functional groups are particularly suited to conferring water solubility or dispersibility on an otherwise water-insoluble polymer. These include carboxylic acid groups, sulfonic acid groups, and tertiary amine groups. Examples of UV-cured polymers include polyacrylamide (PAM), polyvinyl alcohol (PVOH), polyacrylic acid (PAA), polymethacrylate (PMA), polyethylene glycols (PEG), poly(N-isopropylacrylamide) (PNI-PAM), polyvinylpyrrolidone (PVP), polyethyleneimines, quaternary ammonium compounds, such as quaternary pyridinium polymers, nonionic polyurethanes, and mixtures and copolymers thereof.

A suitable composition for forming the water-dispersible indicator layer 32 or water-dispersible regions thereof may include a curable mixture of monomers and/or oligomers, a photo-initiator, a colorant, and may further include one or more additional additives. Example reactive (UV-curable) monomers include vinyl alcohol, ethylene glycol, acrylic acid, acrylamides, such as N-isopropylacrylamide, N-tert-butylacrylamide, and methacrylamide; ethylene glycol, vinylpyrrolidone, 2-ethyl-2-oxazoline (with hydrolysis of the resulting polymer), and oligomers thereof. In particular, the water-dispersible polymer may derived from acrylated urethane oligomer derivatives of polyethylene glycol, partially acrylated polyol oligomers, acrylated oligomers having hydrophilic substituents, and mixtures thereof, as described in above-mentioned U.S. Pat. No. 6,569,373.

In some cases, a water-insoluble or only slightly water-dispersible polymer, such as a polyacrylate, may be combined, in the layer 32, with a water-dispersible component that is, after the curing process, capable of swelling or breaking down upon exposure to water. The layer 32, in this case, may include particles of the water-insoluble polymer dispersed in a matrix composed of the water-dispersible polymer. The water-dispersible component may be formed by curing a curable monomer/oligomer, such as those described above, which forms a water-dispersible polymer. Examples of such monomers/oligomers include an acrylated urethane oligomer derivative of polyethylene glycol, a partially acrylated polyol oligomer, an acrylated oligomer having hydrophilic substituents, or a mixture thereof. The hydrophilic substituents may include acidic substituents, amino substituents, hydroxy substituents, and combinations thereof. The water-dispersible and water-insoluble parts of the composition may be dispersed separately from separate containers, so that they maintain discrete regions within the layer. When the water-soluble phase is washed out by ingress of water, the small particles of the water-insoluble phase are carried with it. In this embodiment, the colorant may be incorporated in the water-insoluble polymer particles, the water-soluble matrix, or both.

Above-mentioned U.S. Pat. Nos. 6,569,373, and 7,300,619 describe two-part compositions in the context of forming a support and/or release material, which can be adapted to use in forming the layer 32. Two-part compositions of this type are available from Objet Geometries Ltd. (now a subsidiary of Stratasys, Ltd.).

Other UV-curable inks which may be used are available from Molecule, 5110-A Port Chicago Hwy, Concord, Calif. 94520.

As the photo-initiator, a free-radical initiator may be used. Examples include benzophenones (aromatic ketones) such as benzophenone, methyl benzophenone, Michler's ketone and xanthones; acylphosphine oxide type photo-initiators such as 2,4,6-trimethylbenzoyldiphenyl phosphine oxide (TMPO), 2,4,6-trimethylbenzoylethoxyphenyl phosphine oxide (TEPO), and bisacylphosphine oxides (BAPO's); and benzoin alkyl ethers such as benzoin, benzoin methyl ether, and benzoin isopropyl ether. Examples of photo-initiators marketed by Ciba Specialties Chemicals Inc. (Ciba) under the trade names Irgacure™ 907 and I-819.

Example colorants for the layer 32 include colored pigments, dyes, and mixtures thereof. Examples of black colorants include carbon black, acetylene black, lamp black, aniline black; magnetites, phthalocyanines, and the like. Other suitable colored pigments and dyes suitable for coating a white plastic casing include cyan, magenta, or yellow pigments or dyes, and mixtures thereof. See, for example U.S. Pat. No. 5,556,727, the disclosure of which is incorporated herein by reference. White colorants may be used where the substrate is not white, such as titanium dioxide. The colorant, e.g., a white, black, cyan, magenta and/or yellow colorant, may be incorporated in an amount sufficient to impart the desired color to the build or support inks. In general, pigment or dye is selected, for example, in an amount of from about 2 to about 60 wt. % such as up to 20 wt. %, or up to 9 wt. %, with the higher amounts being more suited to black and white colorants.

As other additives, surfactants (surface-active agents), inhibitors (thermal stabilizers), non-reactive components, and the like may be incorporated.

The surface-active agent can be used to reduce the surface tension of the formulation to the value desired for jetting, which is typically around 30 dyne/cm. An example of a surface-active agent is silicone surface additive, marketed by Byk Chemie under the trade name Byk 307.

An inhibitor (thermal stabilizer), such as 4-methoxyphenol, may be employed in the composition inhibit the occurrence of thermal polymerization.

The non-reactive components are organic compounds that do not polymerize when cured or do so at a much slower rate than the reactive monomers/oligomers. Examples of such non-reactive organic components include polyethylene glycol, methoxypolyethylene glycol, glycerol, ethoxylated polyol, propylene glycol, and mixtures thereof.

In some embodiments, water is present in the composition.

The composition for forming the layer 32 may be formulated so as to be compatible for use with ink-jet printers and to have a viscosity at room temperature of, for example, about 50 cP. Particularly suitable water-dispersible materials for the layer 32 are soluble or otherwise dispersible in water and do not form a gel when contacted with water which could damage electronic components.

For the water-insoluble layer(s) 46/regions 40 of the layer 32 polymers which are suitable include polyolefins, such as polyethylene polypropylene, and polybutene; poly(alkyl acrylates) and poly(alkyl methacrylates), such as poly(ethyl acrylate), poly(butyl acrylate), and poly(butyl methacrylate; maleic anhydride copolymers, such as poly(maleic anhydride-alt-1-octadecene); polyacrylonitrile and alkyl acrylate copolymers thereof, such as poly(acrylonitrile-co-methyl acrylate); polyamides and polyimides, such as nylon, polyetherimides, polymaleimide; polycarbonates, such as poly(Bisphenol A carbonate and poly(propylene carbonate); polydienes, such as polybutadiene, polyacrylonitrile-co-butadiene), which may be dicarboxy terminated; polyesters, such as poly(1,4-butylene adipate), poly(1,4-butylene terephthalate), and poly(1,4-butylene succinate); polypropylene glycols and copolymers with an ether, such as poly(propylene glycol), O-(2-aminopropyl)-O'-(2-methoxyethyl)polypropylene glycol, and poly(propylene glycol) monobutyl ether; and copolymers and mixtures thereof.

For example a composition comprising one or more UV-curable monomers, such as acrylates and methacrylates, a photo-initiator, optionally a colorant (different from that used in the water-dispersible polymer), and other conventional additives suited to inkjetting can be used in composition for forming the water-insoluble layer(s) 46/regions 40.

While the device 10 is described above in terms of an electronic device, in other embodiments the components within the device casing that are susceptible to water damage may be other objects, such as documents, films, or the like.

Figure 10:
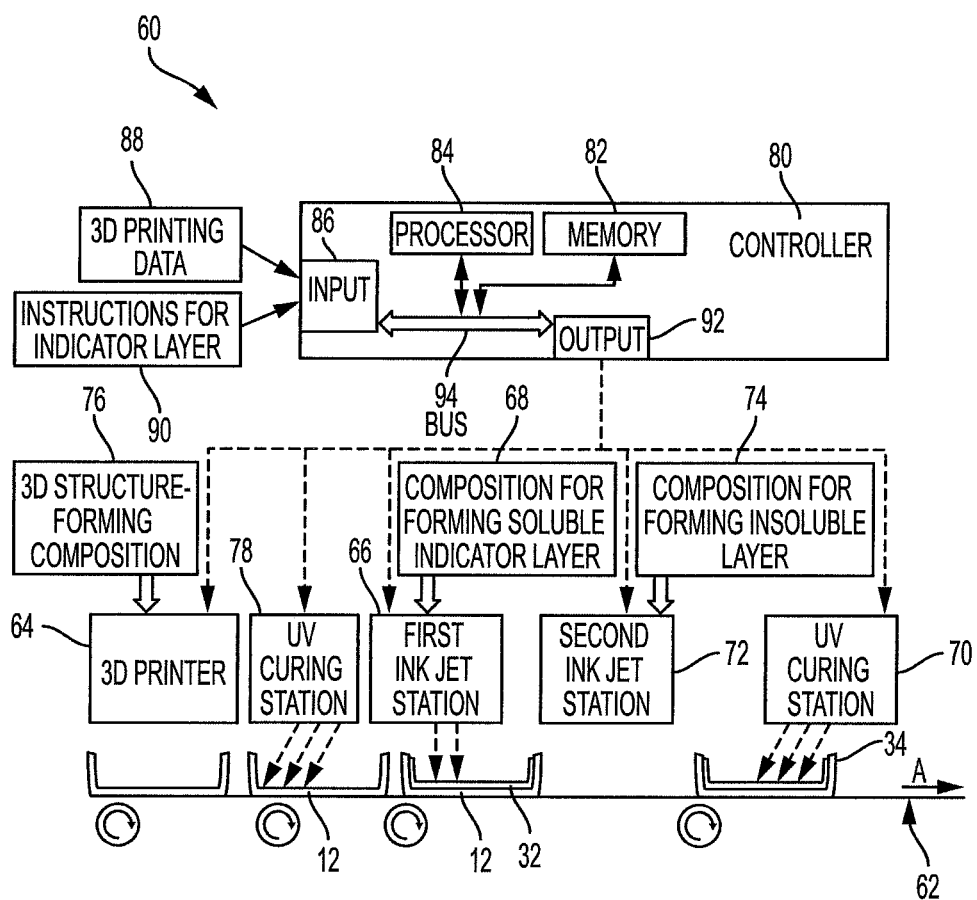
FIG. 10 illustrates an apparatus for forming the electronic device of FIG. 1.

With reference to FIG. 10, an apparatus 60 for forming a three dimensional structure 34, such as a casing member with an indicator thereon is shown. A conveyor system 62 transports a formed casing member 12 or 14 from a 3D printer 64 or other casing-forming apparatus, to an inkjet station 66, in the direction of arrow A. In some embodiments, one or more of the electronic components 16 may be attached to the casing member prior to reaching the inkjet station 66. The inkjet station 66 includes a printhead which jets a composition 68 for forming a polymer layer 32 onto the casing member. The printhead (or printheads) is configured with inkjet ejectors to eject drops of the polymer-forming composition 68 onto a receiving surface 24 of the casing member. A typical printhead suited to use in the an inkjet station 66 includes a plurality of inkjet ejectors that eject ink drops of one or more ink colors onto the receiving surface in response to firing signals that operate actuators in the inkjet ejectors. The inkjets are arranged in an array of one or more rows and columns in the process and cross-process directions. In some embodiments, the inkjets are arranged in staggered diagonal rows across a face of the printhead. The inkjet station 66 may be a drop-on-demand inkjet printer.

In the embodiment in which the layer 32 includes water-insoluble particles dispersed in a water-dispersible matrix, additional inkjets may be provided for dispensing a composition for forming the particles. Alternatively, the particle forming composition may be mixed with the composition 68 just prior to dispensing from the same inkjets.

The casing, with the liquid composition 68 thereon, is conveyed by the conveyor system 62 to a UV curing station 70, which applies UV radiation (e.g., in the wavelength range of 200-400 nm) to the liquid composition 68 to cure it and form a solid layer 32 which firmly adheres to the casing. The casing member 12 or 14 may be conveyed to an assembly station (not shown) where other components 16 of the electronic device are added and the casing members 12, 14 are attached to each other.

In one embodiment, as described with reference to the indicator of FIGS. 5 and/or 9, a second inkjet station 72 includes one or a group of inkjets which jet a second polymer composition 74 for forming a water-insoluble polymer pattern or layer 46 onto the casing member, which may be positioned over, or interspersed with the layer applied by the first inkjet station 66. The second composition 74 may be cured by the same UV curing station 70 or a second UV-curing station. As will be appreciated, rather than being located downstream of the first inkjet station 66, the second inkjet station 72 may be upstream of it, i.e., the positions of the two stations are reversed, so that the water-insoluble polymer pattern is applied first.

The 3D printer 64 may be supplied with a liquid polymer-forming composition 76 for forming the casing member 12 or 14 and may include or be associated with a UV curing station 78 which provides UV radiation to photo-cure the casing member, which may be built as a sequence of layers by additive manufacturing. The layer 32 can thus be the final layer (or layers) of the 3D structure 34.

Thermoforming polymers suited to additive manufacturing of electronic device casings are well known and are described, for example, in U.S. Pub. No. 20160345437.

In other embodiments, the casing member 12, 14 may be pre-formed from plastic, metal, glass, combination thereof, or the like, e.g., by welding, molding, stamping, grinding, combination thereof, or the like.

In another embodiment, the water dispersible UV ink composition 68 may be applied to a sheet of thermoformable plastic which is thermoformed into a plastic casing member after applying the composition 68. In this embodiment, the composition 68 may be cured in the thermoforming step or before it.

The apparatus may be under the control of a controller 80. The controller includes memory 82 which stores instructions for controlling the components of the apparatus and a processor 84 which executes the instructions. The controller may receive, via an input 86, 3D printing data 88, concerning the shape of the casing 12, 14 and/or how it is to be built. Instructions 90 for forming the indicator 30, e.g., its placement on the casing and number of layers to be applied, may also be received as input. The processor sends instructions to components 64, 66, 70, 74, 62 of the apparatus via an output 92. Hardware components 82, 84, 86, 92 of the controller may be connected by a data/control bus 94.

Because of its 3D-shape, the layer 32 is difficult to construct and fit to the casing in an aftermarket process, making its replacement after water damage to the device difficult. Additionally, in some embodiments, the ink composition 68 may be directly jetted onto electronic components 16 which increases the complexity of replacement of the indicator 30. The direct application of the indicator to the device thus avoids the possibility of a user buying a replacement sticker and applying it once a device dries.

Figure 11:
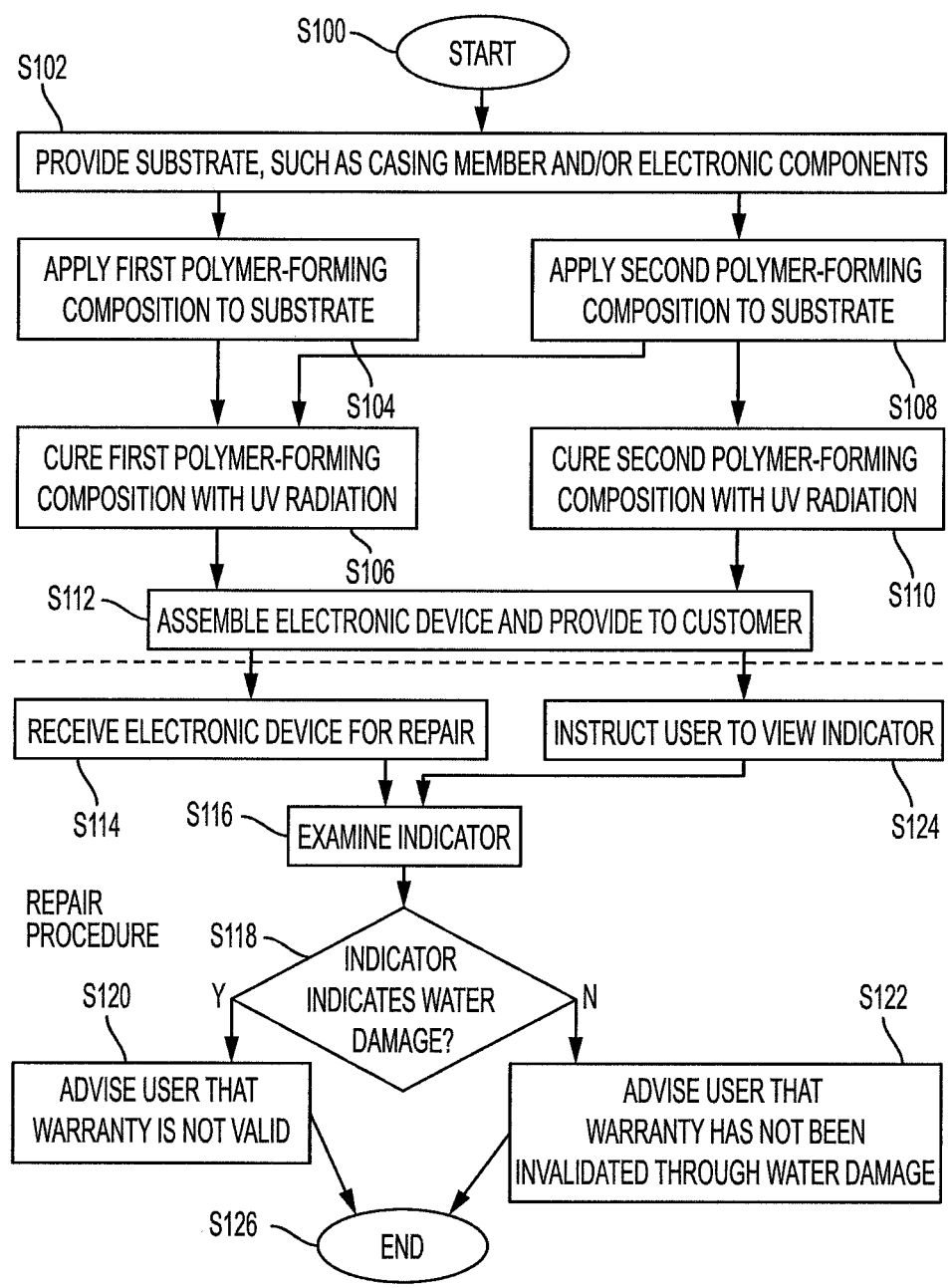
FIG. 11 illustrates a method of forming an indicator for detecting water ingress in accordance with another aspect of the exemplary embodiment.

With reference to FIG. 11 a method of forming a three dimensional structure incorporating an indicator is illustrated. The method begins at S100.

At S102, a substrate is provided. The substrate may be a casing member and/or electronic components. This step may include forming a casing member 12, 14 by additive manufacturing, and optionally providing electronic components 16 on the casing member, as described with reference to FIG. 10. In other embodiments, the substrate is a sheet of material suitably sized for shaping into a casing.

At S104, an indicator 30 is formed on the substrate, e.g., on an inner surface 24 of the casing member 12, 14 and/or electronic components 16 supported thereon. This may include inkjet printing a liquid, UV-curable polymer-forming composition 68 on the casing member 12, 14 and/or electronic components 16 to form a layer in direct contact therewith. Other methods of applying the polymer-forming composition 68 are also contemplated, such as dipping, spraying, draw bar, wiping with a cloth, brushing, or the like.

At S106, the layer of polymer-forming composition 68 is UV-cured on the substrate to form a cured polymer layer 32, which at least partially covers the substrate surface and which is detectably different, e.g. a different color. In some embodiments, where the substrate is a sheet of material, the sheet is formed into the shape of a casing member before, after, or during the UV curing step.

Optionally, at S108, a pattern and/or layer is formed with a second UV-curable polymer-forming composition 74, which is water-insoluble when cured, as described for the embodiment of FIGS. 5 and/or 9. The pattern/layer may be cured at S106 or in a separate UV curing step (S110).

At S112, the electronic device assembly is completed, enclosing the indicator within the device 10. The electronic device 10 may be provided to a user, such as a customer.

At S114, the electronic device 10 may be received from the user at a repair station.

At S116, the electronic device 10 is opened and the indicator 30 is inspected. S116 may include detecting a level of color change that has occurred, for example determining a number or proportion of cells in the embodiment of FIG. 5 which no longer contain (or which still contain) the water-dispersible polymer, or measuring the proportion or area of the layer 32 on the casing which still remains (or which has been removed).

If at S118, the indicator is found to be at least partially washed away, at S120, the user may be advised that any repair performed will not be covered by the warranty provided with the electronic device, even though the warranty period has not expired.

There may be a predetermined threshold level of indicator removal, below which the warranty is considered valid, or for which at least some repairs are covered. For example, if there is minimal removal, as shown in FIG. 6, certain components may still be covered by the warranty. The user may be shown the damaged indicator, or a photograph of it, to demonstrate that water has entered the device and thus the warranty is not valid.

If at S118, the indicator is intact (or has not suffered a threshold level of removal) the user may be advised that the repairs will be covered by the warranty, unless there are other reasons for the warranty being void (S122).

As will be appreciated, for some electronic devices which are expensive to return to a repair station, such as laptops, the user may be provided with instructions, e.g., via phone, text, or email, on how to open the casing to view the indicator 30 (S124). At that point, the user may decide not to return the device if the indicator is clearly damaged, or may agree to assume the costs of shipment, inspection, and/or repair.

The method ends at S126.

As one example, the interior case of a mobile phone is coated with a thin layer of colored water dispersible UV-curable ink. When in contact with water the dispersible UV ink will fade away to clearly indicate contact with water. A determination of water damage can thus be made quickly and efficiently.

The coating layer 32, when cured, cannot be peeled off the surface to which it is attached as a single piece, making it difficult to replace after manufacture by a consumer wishing to disguise potential water damage.

In another embodiment, the water-dispersible coating 32 is used to indicate a failure of a device that is marketed as being waterproof. In this embodiment, the presence or absence of the coating on the interior of the device may be used as evidence of the efficacy of the case to protect its contents from water damage. In this embodiment, the indicator may be located in a position where it is visible through the casing, e.g., covered by a transparent part of the casing, such as a window.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An electronic device comprising:
  a casing;
  electronic components within the casing; and
  a water damage indicator within the casing, the water damage indicator comprising a radiation cured, water-dispersible layer, the water dispersible layer being formed, at least in part, from a UV-curable ink, such that when water enters the casing, the water dispersible layer is at least partially removed, thereby providing an indication of water damage to the electronic components.

2. The electronic device of claim 1, wherein the water-dispersible layer is in contact with at least one of the casing and the electronic components.

3. The electronic device of claim 2, wherein the water-dispersible layer has a different color from the at least one of the casing and the electronic components.

4. The electronic device of claim 1, wherein the indicator consists solely of the water-dispersible layer or a plurality of the water-dispersible layers.

5. The electronic device of claim 1, wherein the water-dispersible layer further includes a radiation cured, water-dispersible polymer.

6. The electronic device of claim 5, wherein the radiation cured water-dispersible polymer is selected from the group consisting of polyacrylamide, polyvinyl alcohol, polyacrylic acid, polymethacrylate, polyethylene glycols, poly(N-isopropylacrylamide), polyvinylpyrrolidone, polyethyleneimines, quaternary ammonium compounds, nonionic polyurethanes, and mixtures and copolymers thereof.

7. The electronic device of claim 1, wherein the indicator further includes a water insoluble polymer.

8. The electronic device of claim 7, wherein the water insoluble polymer restricts flow of the water to at least a region of the water-dispersible layer.

9. The electronic device of claim 7, wherein the water insoluble polymer defines a pattern which partitions the water-dispersible layer into cells that are interconnected by channels.

10. The electronic device of claim 7, wherein the water-insoluble polymer is in the form of particles that are dispersed in a water-dispersible polymer.

11. The electronic device of claim 1, wherein the electronic device is selected from the group consisting of mobile phones, portable music players, laptops, tablets, cameras, and combinations thereof.

12. A method of forming the device of claim 1 comprising:
providing a substrate;
coating the substrate with a radiation-curable composition comprising a UV-curable ink;
UV-curing the radiation-curable composition to form a radiation cured, water-dispersible layer on the substrate, the layer comprising a UV-cured ink and a polymer; and
forming an electronic device from the substrate and radiation cured, water-dispersible layer,
wherein the substrate includes at least one of:
the electronic components, and
a casing member or a moldable sheet from which a casing member is formed after the coating of the substrate with the radiation-curable composition, the casing member forming a part of the casing.

13. The method of claim 12, wherein the coating of the substrate is performed by inkjet printing.

14. The method of claim 12, further comprising forming a pattern or layer of a water-insoluble polymer, which is configured to restrict flow of water to at least a region of the water-dispersible layer.

15. A method of predicting ingress of water to an electronic device comprising:
providing the electronic device of claim 1;
detecting whether a color change has occurred due to water dispersion of at least a part of the radiation cured, water-dispersible layer; and
when the occurrence of the color change is detected, predicting ingress of water.

16. The method of claim 15, wherein the radiation cured, water-dispersible layer has a color which is different from a color of the casing and the color change is caused by the casing being revealed by the water dispersion of the at least a part of the water-dispersible layer.

17. The method of claim 15, wherein when ingress of water is predicted, notifying a user of the device that a warranty on the device not valid.

18. The method of claim 15, wherein the detection of whether a color change has occurred includes detecting a level to which the color change has occurred.

19. A device comprising:
a casing; and
components within the casing that are susceptible to water damage;
a water damage indicator mounted within the casing, the water damage indicator comprising a radiation cured, water-dispersible layer in direct contact with at least a part of the casing, the water-dispersible layer including a polymer and a UV-cured, water dispersible colorant, such that when water enters the casing, the water dispersible layer is at least partially removed to reveal the casing, thereby providing an indication of water damage to the components.

20. A method for detecting water damage in an electronic device comprising:
receiving the electronic device which may have suffered water damage through ingress of water;
examining a water damage indicator which includes a water-dispersible polymer layer which has been directly applied onto an interior surface of the electronic device by UV curing a UV-curable composition comprising a UV-curable ink, the polymer layer including a water-dispersible polymer and having a different color to the interior surface; and
predicting an extent of water damage based on a level of the polymer layer removed.

* * * * *